April 20, 1954 R. E. TAGGART ET AL 2,675,657
PACKAGING MACHINE CONTROL
Filed Oct. 10, 1951 7 Sheets-Sheet 1
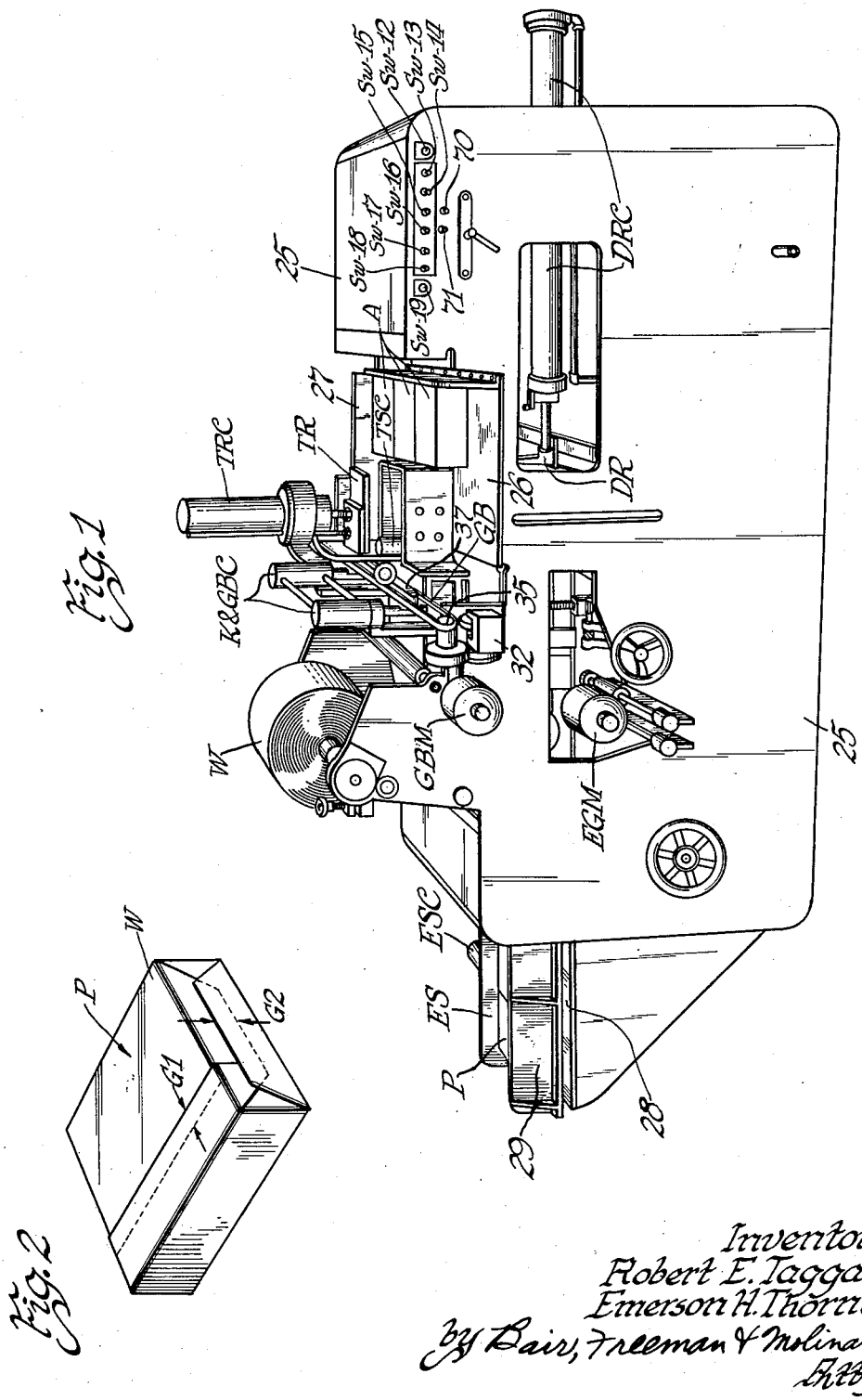
Inventors
Robert E. Taggart
Emerson H. Thorne
by Bair, Freeman & Molinare
Attys.

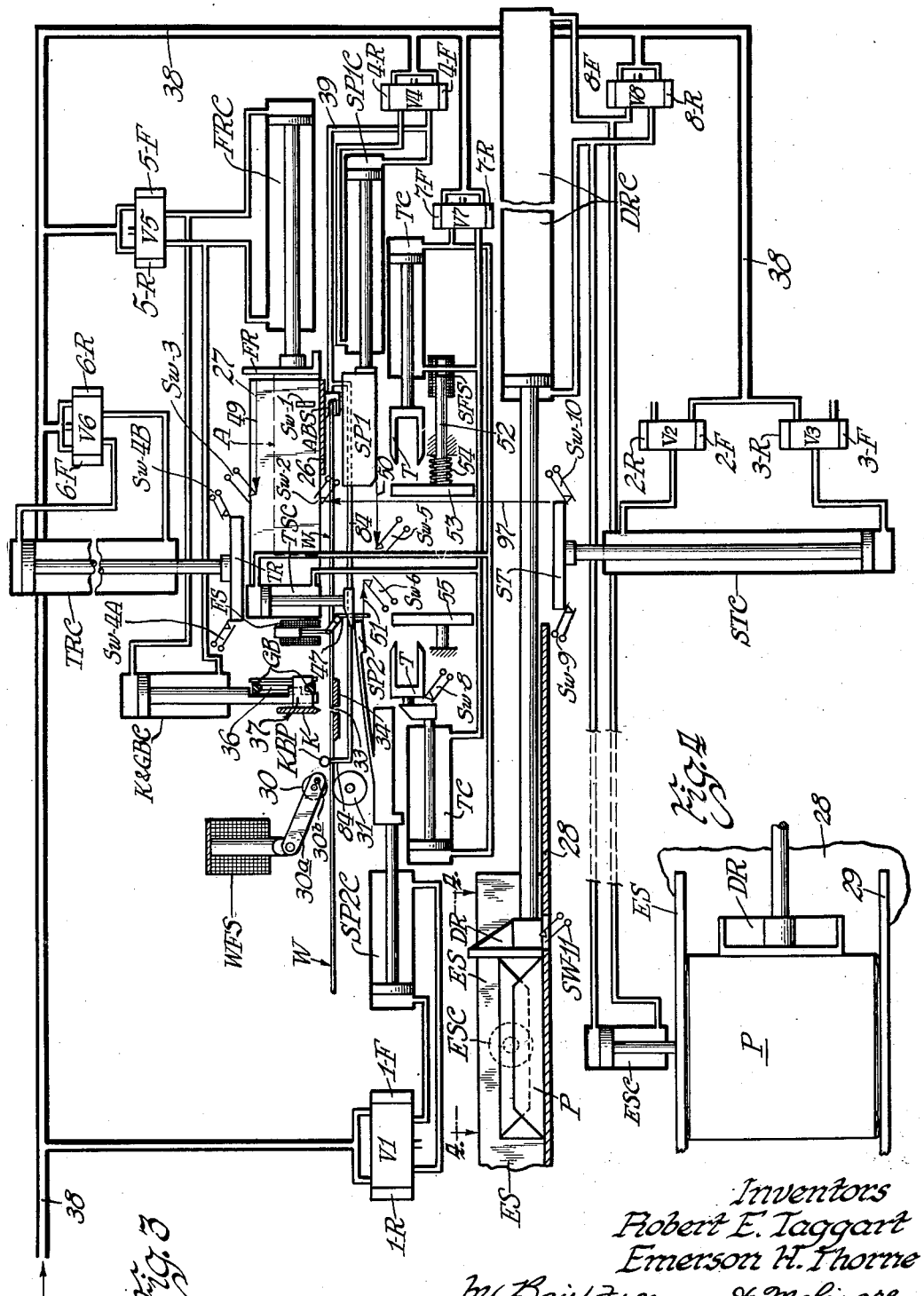

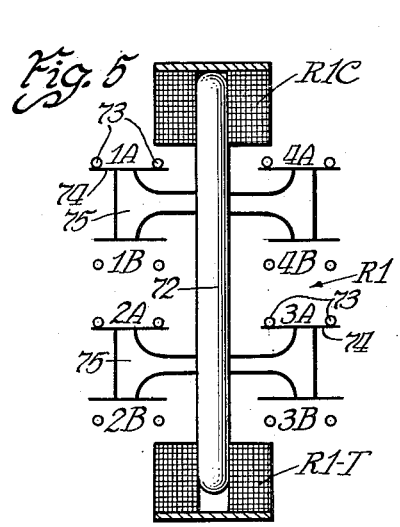
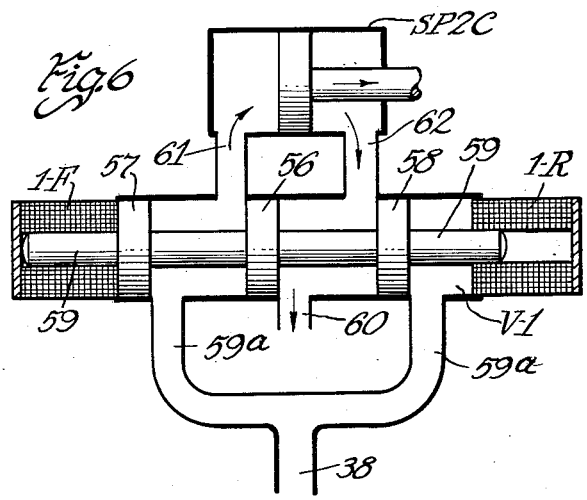
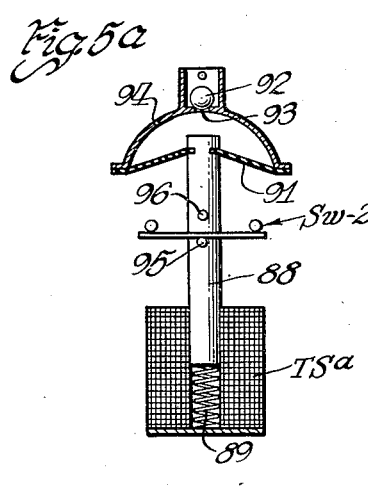
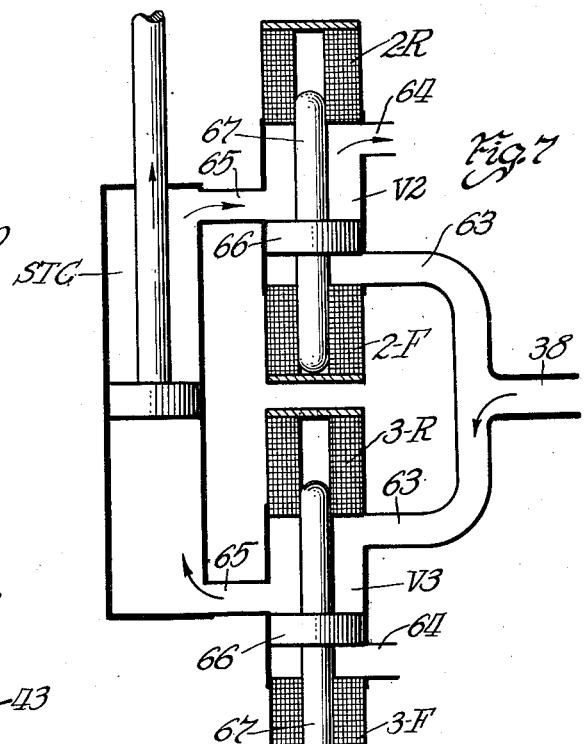
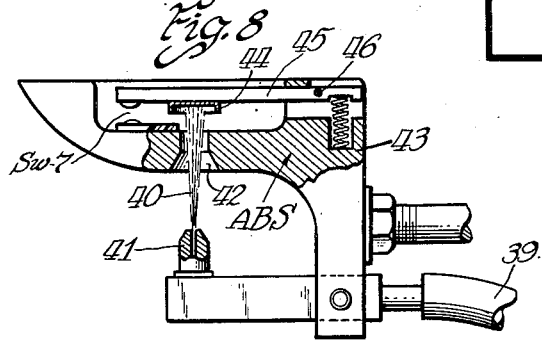

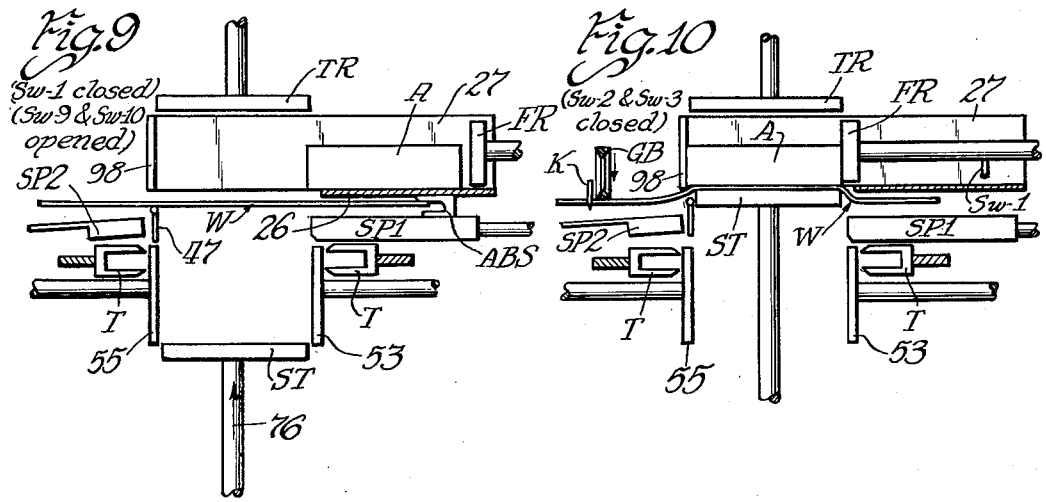
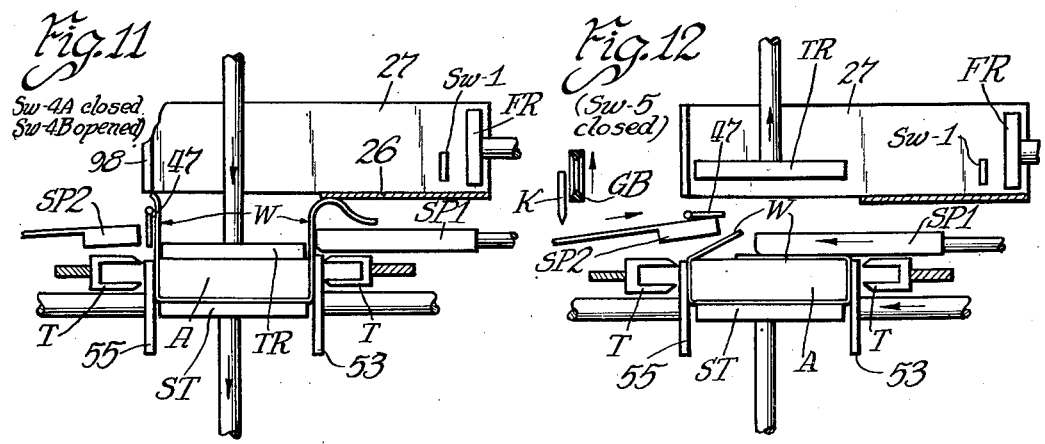
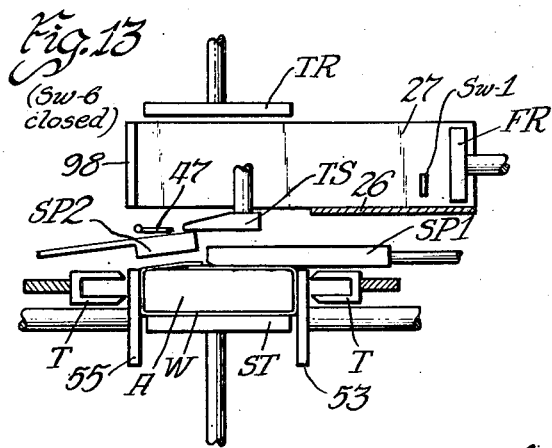

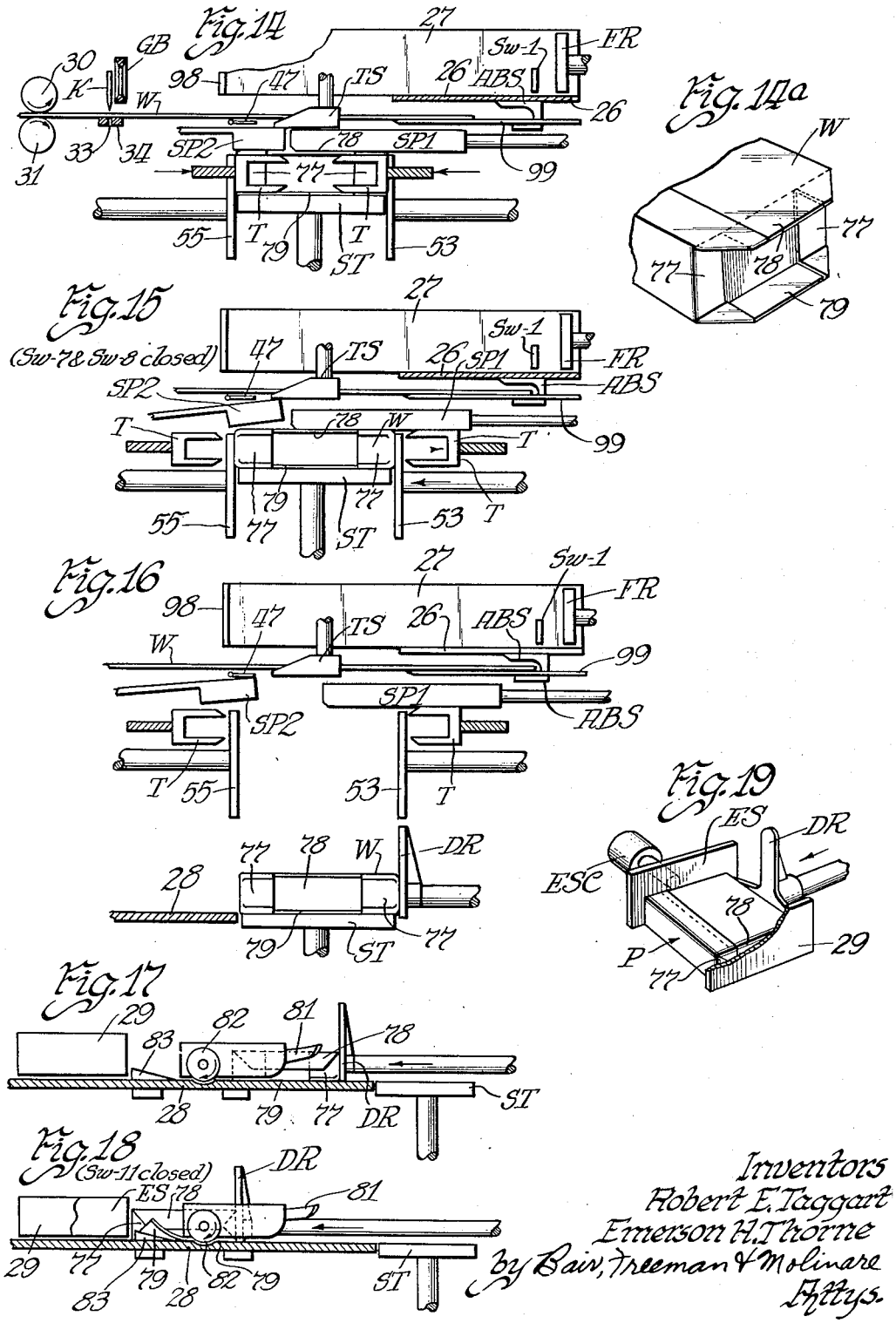

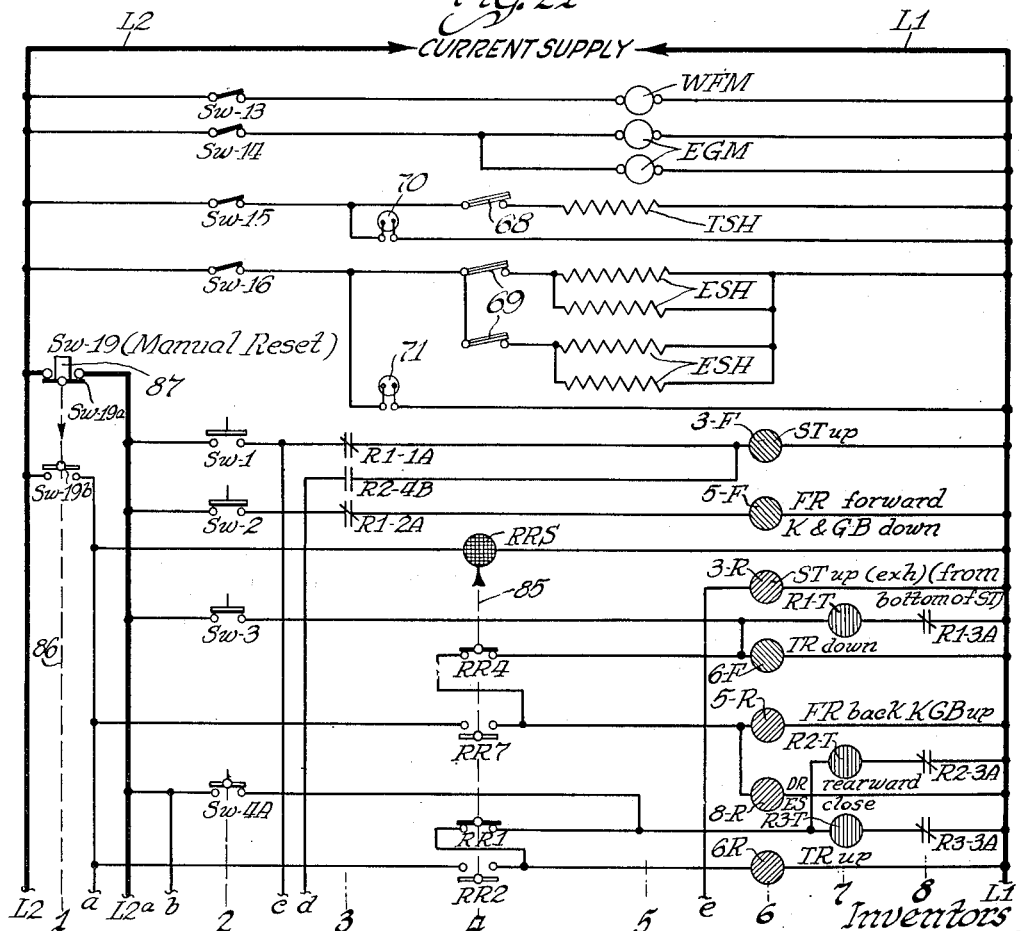

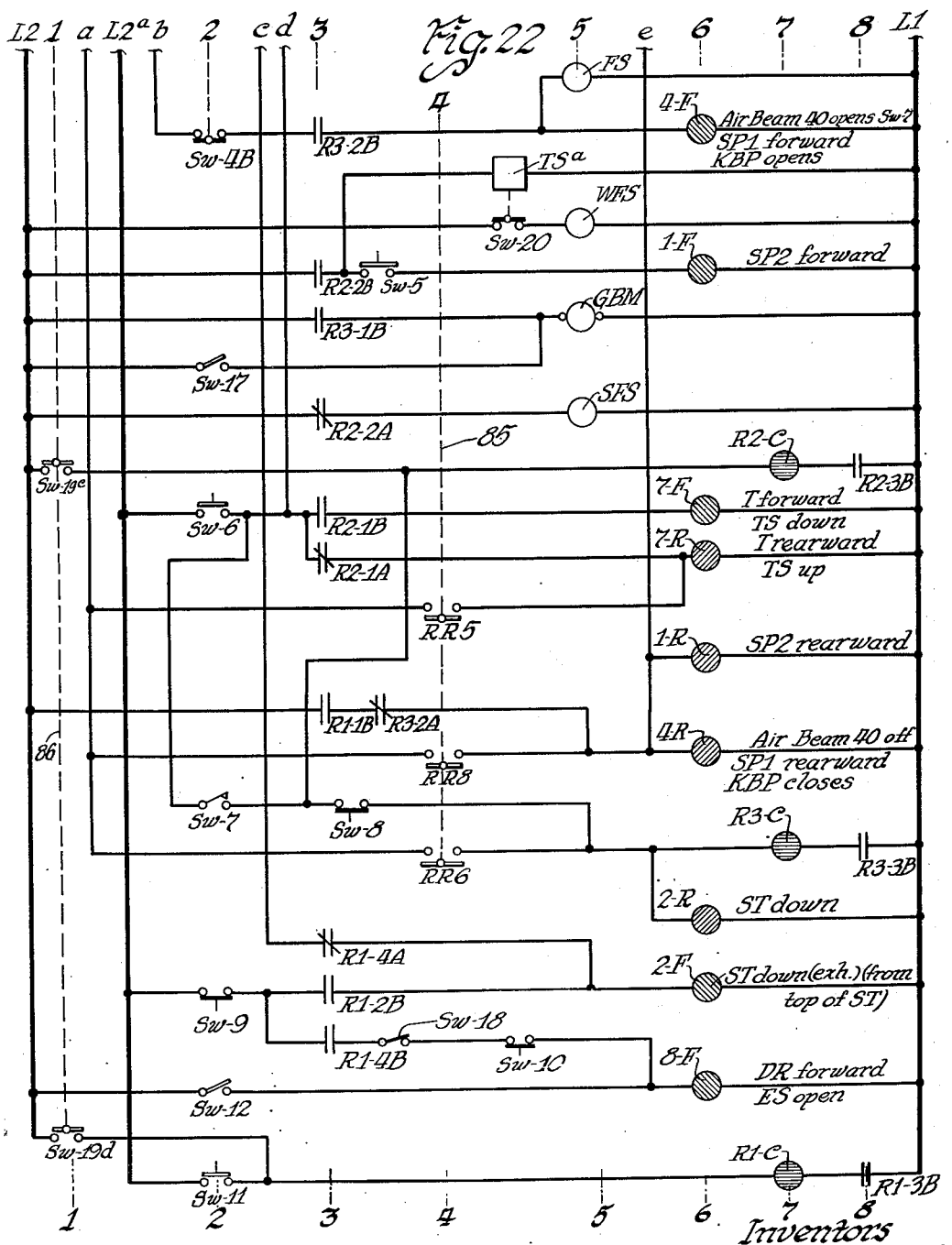

Patented Apr. 20, 1954

2,675,657

UNITED STATES PATENT OFFICE 2,675,657

PACKAGING MACHINE CONTROL

Robert E. Taggart and Emerson Howard Thorne, Toledo, Ohio, assignors to Lynch Corporation, Anderson, Ind., a corporation of Indiana Application October 10, 1951, Serial No. 250,692

16 Claims. (Cl. 53—32)

This invention relates to a control system for a packaging machine of the kind shown in Stevens Patent No. 2,292,487 and disclosed in the copending application of Doepel and Wiley, Serial No. 103,875, filed July 9, 1949.

The main object of the present invention is simplification of the control system and a reduction in the number of machine element-operated limit switches of the Doepel and Wiley patent in order to bring about better operating characteristics of the packaging machine shown in the Stevens and the Doepel and Wiley patents and to provide the ultimate in proper shutdown of the machine when a package being wrapped jams at any point in the machine during any part of the wrapping operation being performed on the package or when any malfunctioning of the machine occurs.

A further object is to provide an improved arrangement of electrical control devices for controlling the pneumatically operated machine elements of a packaging machine, and to provide switching arrangements that permit maximum manual control by the operator of the various machine elements as required in addition to automatic operation in sequence of the various relays, solenoid valves and actuating solenoids for other machine elements in order to perform the various functions of the packaging machine.

Still a further object is to provide a circuit arrangement that permits a superior operating sequence of the successively controlled relays, solenoid valves and other solenoid-operated instrumentalities of the Doepel and Wiley patent with greater safety in connection with each step of the operation of the machine and permits proper reversion of the machine elements to their starting positions in response to manual operation of a reset switch and a reset relay operated thereby after clearing the machine of a jammed package, or when reset is desirable after adjusting any malfunctioning of the machine or after readjusting it for different sizes of packages.

With these and other objects in view, our invention consists in the construction, arrangement and combination of the various parts of our packaging machine control whereby the objects contemplated are attained, as hereinafter more fully set forth, pointed out in our claims and illustrated in the accompanying drawings, wherein:

Figure 1 is a perspective view of a packaging machine of the character to which our present control system has been applied.

Figure 2 is a perspective view of a typical package wrapped thereby.

Figure 3 is a diagrammatic view of the various pneumatically-operated instrumentalities of the packaging machine, the solenoid valves and the solenoid-operated instrumentalities of the machine together with the pneumatic circuit and a series of limit switches operated by the pneumatically-operated instrumentalities for initiating the next step in the cycle of operation by proper operation and completion of the preceding step of the cycle, no electric wiring being shown.

Figure 4 is a plan view of the indicated line 4—4 of Figure 3 to illustrate an end seal mechanism and its operating cylinder, the connection thereof to a pair of pneumatic lines in Figure 3 being indicated by dotted continuation lines.

Figure 5 is a diagrammatic view of a typical solenoid-operated relay, three of which are used in our control system.

Figure 5a is a similar diagrammatic view of a timer solenoid and a switch operated thereby.

Figure 6 is a diagrammatic view of a double-throw pneumatic control valve, and a cylinder and piston controlled thereby, six of these valves being used in the machine as illustrated in Figure 3.

Figure 7 is a similar diagrammatic view showing a double valve arrangement for one of the cylinders disclosed in Figure 3.

Figure 8 is a side elevation, partly in section, of an air beam switch of the packaging machine.

Figures 9 to 19 are diagrammatic views similar to portions of Figure 3 to show various steps in the packaging operation from insertion of the article to be packaged to the final sealing of the wrapper flaps at the end of the package.

Figure 14a is a perspective of one end of a partially wrapped package as it appears after the wrapping step performed in Figure 14.

Figure 20 is a chart of symbols used in connection with Figures 21 and 22; and

Figures 21 and 22 are an electrodiagrammatic view of the wiring for our control system, the upper end of Figure 22 being a continuation of the lower end of Figure 21.

On the accompanying drawings, reference being had to Figure 1, we have used the reference numeral 25 to indicate in general the frame of the packaging machine involved. As to the general details there disclosed, a loading table or plate 26 is shown on which articles A are placed by the operator and pushed against a stop plate 27. The packaging machine packages the article A and the completed package indicated at P is discharged from the machine on a discharge plate 28 between a side plate 29 and an end seal ES which also is in the form of a plate. A roll of wrapping paper W is illustrated in which the articles A are wrapped.

Also shown in this figure is a top ram cylinder TRC from which a piston rod extends and terminates in a top ram TR. A knife and glue belt cylinder K&GBC is provided in pairs for moving a glue belt GB into contact with the wrapper W. A knife K is also provided for cutting the wrapper and is propelled by the cylinder K&GBC. The knife K is not shown in Figure 1 but appears in Figure 3. This knife will be referred to later on in the description of the operation.

In Figure 1 a wrapper engaging roller 30 is shown and opposing it as shown in Figure 3 is a wrapper feed roller 31. A wrapper feed motor WFM, referred to in Figure 21, is provided for rotating the roller 31 through suitable step-down gearing. A glue belt motor GBM drives the glue belt GB, the gluepot for the glue belt being shown at 32.

Adjacent the left end of Figure 1 an end seal cylinder ESC is shown and adjacent the right end thereof a discharge ram cylinder DRC. A motor is shown at EGM, this being one of a pair of end glue motors for gluing the end flaps of the package. The mechanical details of the mechanism will not be gone into further except as to the machine elements that enter into the wrapping operation of the machine under control of our control system as herein disclosed inasmuch as those details are shown in the Doepel and Wiley patent. Wherever changes from the specification of that patent have been made in accordance with our disclosure, the difference will be described in detail.

Figure 2 illustrates a completed package P and it will be seen that the wrapper W is wrapped around the package with a lap joint at G1. This is a glued lap, being the first one performed in the machine. Also at each end of the package P the end flaps are glued as indicated at G2.

Referring to Figures 3 and 4, a complete diagram of the pneumatic instrumentalities of the packaging machine is shown and in addition to the top ram TR and its cylinder TRC, the glue belt GB and its cylinder K&GB and the end seal ES and its cylinder ESC already referred to, the following instrumentalities are shown, each being provided with an operating cylinder as indicated.

| Reference Character | Machine Element | Cylinder |
|---|---|---|
| ST | Seal Table | STC. |
| FR | Feed Ram | FRC. |
| DR | Discharge Ram | DRC. |
| SP1 | No. 1 Seal Plate | SP1C. |
| SP2 | No. 2 Seal Plate | SP2C. |
| T (two) | Tuckers | TC (two). |
| TS | Top Seal | TSC. |

The knife K adjacent the glue belt GB is adapted to sever a single wrapper from the wrapping material W when the cylinder K&GB is properly charged with compressed air to lower the glue belt and the knife whereupon the knife enters a slot 33 in a supporting shoe 34 for the wrapper.

Other machine elements shown in Figure 3 bear the following reference characters:

| Reference Character | Machine Element |
|---|---|
| KBP | Knife Blow Pipe. |
| FS | Flipper Solenoid. |
| WFS | Wrapper Feed Solenoid. |
| SFS | Side Fold Solenoid. |
| ABS | Air Beam Switch. |

Each of the cylinders above referred to has a piston therein with a piston rod extending out of the cylinder and connected with the machine element for that cylinder as obvious from an inspection of Figure 3. The pistons and their rods have not been given reference numerals as it is thought the construction is obvious, and reference numerals would crowd the drawing. It might be explained, however, that the glue belt GB is trained around a pair of pulleys, the near side pulley being shown at 35 in Figure 1 and the far side pulley at 36 in Figure 3, the piston rod for the cylinder K&GB having a grooved bar 37 to depress the portion of the glue belt spanning the wrapper W so that this portion contacts the wrapper, and the glue on the surface of the belt is thereby transferred to the wrapper.

Eight solenoid-operated control valves are provided for the eleven cylinders shown in Figures 3 and 4. These bear reference characters V1 to V8 and each valve has a solenoid at each end thereof which are labeled 1-F to 8-F and 1-R to 8-R, "F" indicating forward motion of the piston rod and "R" indicating rearward motion thereof. There is provided one solenoid-operated valve for one or more cylinders except the cylinder STC which has two valves V2 and V3 for the operations thereof. The three cylinders TC, TC and TSC are connected in parallel and controlled by one valve V1, the two cylinders FRC and K&GBC are controlled by the one valve V5 and the two cylinders DRC and ESC are controlled by one valve V8.

The compressed air supply line to all eight valves is shown at 38 (heavy lines). The air lines from the valves to the cylinders (light lines) have not been given reference numerals as the arrangement is believed clearly obvious from an inspection of Figures 3 and 4. Certain branch connections, however, will now be referred to. An air beam switch ABS is shown and a branch connection 39 leads thereto from the 4-R end of the valve V4 and a further branch 84 leads to the knife blow pipe KBP.

Details of the air beam switch are shown in Figure 8. The air beam is illustrated at 40, being compressed air discharged from a nozzle 41 through an opening 42 in the frame 43 of the air beam switch and into a cup 44. This cup is mounted on an arm 45 (pivoted at 46) of a switch Sw-7 which is normally closed, but when the air beam 40 strikes the cup 44, it is held open. When the wrapper W, however, enters the air beam switch between the nozzle 41 and the opening 42, it will cut the air beam 40 and permit the switch to close. The knife blow pipe KBP spans the wrapper W and has a series of spaced perforations along its lower surface to discharge air against the wrapper W to insure that the wrapper material will pass properly under the knife K.

Adjacent the upper left portion of Figure 3, the wrapper feed solenoid WFS and the flipper solenoid FS are disclosed. The solenoid WFS when energized lifts the wrapper engaging roller 30 (lever 30a pivoted on center 30b) as shown so that even though the wrapper feed roller 31 is rotating the wrapper W will not be fed. The flipper solenoid FS, when energized, swings a normally depending flipper plate 47 counterclockwise from the position shown to a horizontal position to support the wrapper W as it is fed toward the right to the air beam switch ABS.

A series of limit switches Sw-1 to Sw-11 are provided to be operated depending on the presence of an article to be wrapped on the loading plate 26 against the stop 27 and on the positions of certain of the machine elements as will now be described. The normally open switch Sw–1 is mounted in the stop plate 27 to be engaged and closed by the article A as it is pushed into the machine by the operator. The normally open switch Sw–2 is closed by the seal table ST in its uppermost position (indicated by the arrow 97) and normally open switches Sw–9 and Sw–10 are closed in that sequence by the seal table ST in its down position. The arrangement has been shown merely diagrammatically with actual contact of the seal table with the switches Sw–2, Sw–9 and Sw–10.

The switch Sw–3 is normally open and is adapted to be closed when the feed ram FR reaches its forward position as indicated by the arrow 49. The fourth switch controls two circuits. Sw–4A is normally closed and adapted to be opened, while the switch Sw–4B is normally open and adapted to be closed by the top ram in its uppermost position. The switch Sw–5 is normally open and adapted to be closed by the #1 seal plate SP1 in its forward position as indicated by the arrow 50. The switch Sw–6 is normally open and adapted to be closed by the #2 seal plate SP2 in its forward position as indicated by the arrow 51.

The switch Sw–7 has already been described, being the air beam switch. The switch Sw–8 is normally open and adapted to be closed by the left-hand tucker T when in the retracted position shown. The switch Sw–11 is normally open and adapted to be closed momentarily by the package P during its discharge movement along the plate 28 (to the left in Figure 3).

While we have shown the various machine elements as directly engaging the switches Sw–1 to Sw–10 and the package P directly engaging the switch Sw–11, it is to be understood that in actual practice the switches are enclosed and provided with suitable insulated elements engaged by any suitable movable part of the machine element that operates the switch rather than the exact arrangement shown only diagrammatically in Figure 3. All parts of the machine are shown in this figure in the position they assume upon the completion of the cycle of operation, which completion is accomplished by the package P engaging and then passing beyond the switch Sw–11. Thereupon the machine is in condition for starting the next cycle or wrapping operation.

The side fold solenoid SFS when energized attracts a plunger 52 for retracting a side fold plate 53 against the action of a spring 54. Opposing the plate 53 is a stationary side fold plate 55 and these two plates define a well into which the article and the wrapper is moved downwardly as will hereinafter appear.

As to the construction and operation of the valves V1, V4, V5, V6, V7 and V8, which are all similar, reference is made to Figure 6. These are spool valves in which spool heads 56, 57 and 58 are mounted on a plunger 59 which, in the diagrammatic showing, may constitute a plunger for the solenoid coils 1–F and 1–R. Inlet ports 59a connect to the valve body from the compressed air supply line 38. The valve body also has an exhaust port 60 and cylinder ports 61 and 62 leading to the rearward and forward ends respectively of the cylinder in each case, Figure 6 illustrating the #2 seal plate cylinder SP2C controlled by the valve V1.

The porting arrangement is such that when the solenoid coil 1–F is energized as illustrated, compressed air flows behind the piston in the cylinder and exhausts from in front of the piston, all as shown by arrows in Figure 6 and drives the piston rod in the forward direction as indicated by the arrow thereon. When the solenoid 1–R is energized the piston is driven in the rearward direction.

For the seal table cylinder STC, the two valves V2 and V3 are provided and each of these has an inlet port 63 connected to the compressed air supply line 38 and an exhaust port 64 as shown in Figure 7. Each of the valve bodies V2 and V3 also has a cylinder port 65. The cylinder ports are connected with opposite ends of the cylinder STC, the port 65 for the valve V3 to the rear or lower end of the cylinder and the port 65 of the valve V2 to the upper or forward end of the cylinder.

After the solenoid coils 2–F and 3–F are energized, air flows into the rear of the cylinder STC for elevating the seal table ST while the air above the piston exhausts from the front of the cylinder through the valve V2 as illustrated. When either coil of either valve is energized and then de-energized, the spool 66 on the plunger 67 will remain in the position to which it was driven by such energization until the other solenoid coil of that valve is energized. This arrangement is desirable in order to permit the seal table ST to be elevated when the valves V2 and V3 are in the position of Figure 7 and for air to be exhausted from under the piston of the seal table for permitting the package to be partially lowered by the top ram TR to wrapping position (which will hereinafter be referred to) when the solenoid coil 3–R is energized, without introducing air into the cylinder STC above the piston, and then later the solenoid 2–R may be energized for introducing air above the piston which will drive it down to the bottom of its stroke after which the solenoid coil 2–F is energized for exhausting air from above the piston so that the piston can later rise during the beginning of the next wrapping cycle when the solenoid coil 3–F is energized as will hereinafter appear in connection with the description of the cycle of operation referred to in connection with Figures 9 to 19.

Referring next to the electro-diagram in Figures 21 and 22, the switches Sw–1 to Sw–11 are shown as well as additional switches for various electrically-operated devices of the packaging machine. The switches Sw–1 to Sw–11 are in a vertical row indicated 2 at the top of Figure 22 and at the bottom of Figures 21 and 22, with the exception of Sw–5, Sw–8 and Sw–10, which have been displaced to the right in order to be at the proper position in the circuit. The current supply is indicated at the top of Figure 21 and lines L2 and L1 extend therefrom along the left and right sides respectively of Figures 21 and 22. These lines are heavy as they are the feeder wires, the wiring diagram illustrated being such that the electric circuit for any electrically-operated element and through any switch of the control system can be readily traced from left to right. Part of such tracing may be from a heavy line L2a wherever applicable as this is in effect also a feed line because it is fed from the line L2 through a normally closed switch Sw–19a.

Manually operable switches Sw–12 to Sw–19 are also disclosed, Sw–12 being adjacent the lower left corner of Figure 22 in row 2, switches Sw–13, Sw–14, Sw–15, Sw–16 and Sw–17 also being in this row starting at the top of Figure 21. Sw–18 is displaced to the right of the row 2 below Sw–9 and Sw–19 is in a left-hand row indicated 1, this being a manual reset switch having the normally closed switch Sw–19ᵃ and three switches Sw–19ᵇ, Sw–19ᶜ and Sw–19ᵈ which are normally open.

Also involved in the manual reset switch Sw–19 is a reset relay comprising a reset relay solenoid RRS and reset relay contacts RR1, RR2, RR4, RR5, RR6, RR7 and RR8 in row 4. Some of these contacts are normally open and some are normally closed and they are mechanically connected together as indicated by a dash line 85. These contacts are changed as to the positions shown in Figures 21 and 22 whenever the reset relay solenoid RRS is energized.

This solenoid is energized by closure of the switch Sw–19ᵇ when the manual reset switch Sw–19 is depressed at the push button indicated at 87. The contacts Sw–19ᵃ, Sw–19ᵇ, Sw–19ᶜ and Sw–19ᵈ are likewise mechanically connected together as indicated at 86. Whenever manual reset is desirable, the push button 87 is depressed for operating the switch Sw–19 and energizing the reset relay solenoid RRS for operating the reset relay contacts just described, thus conditioning all parts of the circuit for starting again at the beginning of a cycle of operation of the machine.

In a fifth row (5) and reading from top to bottom in Figure 21 is the wrapper feed motor WFM, the two end glue motors EGM, the flipper solenoid FS (Figure 22), the wrapped feed solenoid WFS, the glue belt motor GBM, and the side fold solenoid SFS already referred to.

In a sixth row (6) of the diagram the eight forward coils 1–F to 8–F and the eight rearward coils 1–R to 8–R of the eight valves V1 to V8 already referred to are shown in the circuit.

Also shown in Figure 21 is a top seal heater TSH controlled by the switch Sw–15. A thermostat 68 automatically controls the top seal heater TSH to maintain it at a substantially constant temperature. This heater is contained in the #2 seal plate SP2.

Next are four end seal heaters ESH controlled manually by the switch Sw–16 and automatically by thermostats 69. These heaters are contained in the end seal plates 28 and ES. The heaters TSH and ESH are provided with pilot lamps 70 and 71 respectively to indicate whether or not the switches Sw–15 and Sw–16 are closed.

Three main relays are provided under control of the switches Sw–1 to Sw–11 for energizing the circuits in the proper order for a complete cycle of operations and in Figure 5 we show one of these relays indicated as R–1. This relay has a close coil R1–C and a trip coil R1–T. The solenoid coils just referred to act on a plunger 72 to move it in one direction or the other and after it is moved and the coil that caused movement is de-energized, the relay stays in that position until the other coil is energized.

The relay R1 has eight sets of contacts designated 1A, 4A, 1B, 4B, 2A, 3A, 2B and 3B in Figure 5; whereas in Figures 21 and 22 they are designated as R1–1A, R1–4A, R1–1B, R1–4B, R1–2A, R1–3A, R1–2B and R1–3B respectively to distinguish the eight switches from seven switches for the relay R2 and five switches for the relay R3 shown in Figures 21 and 22. Figure 5 illustrates diagrammatically that the various switches referred to consist of, in each instance, a pair of contacts 73 and a blade 74 to bridge them, the blades being carried by cross arms 75 of the core 72. This figure, of course, is merely diagrammatic and serves to show how the A switches are all closed when the coil R1–C is energized, the B switches being opened at that time, and the B switches being closed and the A switches opened by energization of the solenoid coil R1–T.

In the row indicated at 3 in Figures 21 and 22, most of the relay contacts just referred to are shown. Some, however, are displaced from this row, R1–3A being below R1–2A and displaced to the right, falling in row 8 in which the contacts R2–3A, R3–3A, R2–3B, R3–3B and R1–3B are located and R3–2A being displaced slightly to the right of R1–1B in row 3.

The close coils C and trip coils T of the three main relays are shown on the wiring diagram in row 7. The only other element in these two figures which requires explanation is the switch Sw–20 between rows 4 and 5 and adjacent the top in Figure 22. This is the timer switch already referred to as including the timer solenoid TSᵃ. Referring to Figure 5a wherein the timer switch is shown diagrammatically, a pneumatic dashpot arrangement is provided for the solenoid core and permits quick closing of the switch Sw–20 when the timer solenoid TSᵃ is de-energized but delays the opening of this switch when the timer solenoid TSᵃ is energized. This figure illustrates a plunger 88 normally raised by a spring 89 to close the switch Sw–20 when the coil TSᵃ is de-energized as illustrated.

In this position a stop pin 95 on the plunger or core 88 has effected closure of the switch Sw–20 and this switch is provided with over-center means so as to be retained in that position until physical means is provided for separating the bridging contact from the stationary contacts.

As further illustrated in Figure 5a, an air chamber 90 is shown having a diaphragm 91 spanning the chamber and connected with the plunger 88. The air chamber has a leak 94 and a somewhat larger opening 93 for ready escape of air which opening is normally closed by a check ball 92. A second pin 96 on the plunger 88 is illustrated to show diagrammatically a lost motion connection.

When the coil TSᵃ is energized, the plunger 88 will move slowly into the coil because the valve 92 remains on the seat 93 and air can enter the chamber 90 only through the leak 94. It therefore takes some time for the pin 26 to engage the bridging contact of the switch Sw–20 which gives a delayed action for opening of the switch. The leak 94 is readily adjustable so as to delay the opening of the switch Sw–20 and thereby delay the start of the wrapper W feeding operation as desired following closure of the limit switch Sw–4 and of the relay contacts R2–2B so that the advance edge of the wrapper will enter the air beam 40 between the closure of switches Sw–6 and Sw–8.

When the coil TSᵃ is de-energized, however, the spring 89 expands and the air compressed in the chamber 90 lifts the ball 92 from the seat 93 so that there is ready escape of air from the chamber and accordingly quick closing of the switch Sw–20 to promptly stop wrapper feeding.

Referring to Figure 2, the article A is placed on the loading plate 26 (as also shown in Figure 1) and pushed against the stop plate 27, engaging the switch Sw-I and closing it as it does so. The sequence of operations initiated by the closure of the switch Sw-I will be referred to in detail after describing the operations that take place for wrapping the article as illustrated successively in Figures 9 to 19.

In Figure 9 the article A has engaged the switch Sw-I and initiated operation which results in the seal table ST being elevated as indicated by the arrow 76, the wrapper W having already been advanced by the feed roller 31 in Figure 3 across the raised flipper plate 47 and into the air beam switch ABS which resulted in stopping the feeding of the wrapper. The wrapper is below the loading plate 26 so that the seal table can come up and engage it and raise it to a position level with the loading plate as in Figure 10 so that the feed ram FR can push the article on to the wrapper where it is supported by the seal table ST as illustrated.

The next step in the operation is shown in Figure 11, the top ram TR driving the article and the wrapper downwardly to wrapping position opposite the tuckers T. In doing this, the wrapper is folded along the sides of the article by the side fold plates 53 and 55, the side fold solenoid SFS being de-energized at this time so that the spring 54 is in effect to press the side fold plate 53 tightly against the wrapper and the partially wrapped package in turn tightly against the stationary side plate 55.

Next, as in Figure 12, the top ram TR is raised out of the way and the #1 seal plate SP1 is advanced to fold down the top flap on the article A following which the #2 seal plate SP2 advances (shown partly advanced in this figure), the flipper plate 47 being raised out of the way by energization of the flipper solenoid FS. The seal table ST then moves up for a package press operation. In the next step of the operation (Figure 13) the #2 seal plate SP2 has moved all the way forward for completing the wrapping of four sides of the article, the marginal edge of the undersurface of the short flap to the left on top of the article being the part to which the glue belt has applied glue so that the top of the package may be sealed along this glue-line. As shown in Figure 14, the wrapper is moving onto supporting rods 99, the tuckers T have been moved forward and the top seal TS moved downwardly to press the #2 seal plate tightly against the glued flap for top-sealing the package. The tuckers T fold in end flap portions 77 as shown in Figure 14a leaving an upper end flap 78 and a lower end flap 79 still to be folded, the operation, of course, being performed on both ends of the package P.

After the flaps 77 are folded, the tuckers T are drawn back as in Figure 15 and the top seal raises again. In Figure 16 both the top seal plates SP1 and SP2 have moved back and the seal table ST has moved down to a position level with the discharge plate 28. The discharge ram DR at this time is retracted as shown and the next step in the operation is the forward movement of the discharge ram as shown progressively in Figures 17 and 18. In Figure 17 the movement of the partially wrapped packages results in folding the flaps 78 downwardly by flap folder blades 81 at each end of the package after which further movement causes the bottom flaps 79 to pass under glue-applying rollers 82 to apply glue to the marginal upper edges of the still unfolded flaps 79. This is shown in Figure 18 and also shown therein are the flaps 79 being folded upwardly by flap folder blades 83.

Further movement of the discharge ram DR causes the completely wrapped package to pass between the seal plates 29 and ES as in Figures 4 and 19, during which time air is supplied to the front end of the end seal cylinder ESC to move the end seal ES to provide clearance for the package P as it moves forwardly. Subsequently (when the discharge ram is retracted), the end seal ES is driven pneumatically tightly against the package P for sealing the glued end flap 79 against the end flap 78 as indicated by the glued flap G2 in Figure 2.

Reference is now made to Figures 20, 21 and 22. In the latter two figures the complete electrical diagram of our control system is shown. Figure 20 is a chart of the symbols used in Figures 21 and 22. The various relays, their contacts and solenoid coils, the valve operating solenoids, and the manual and limit switches of the entire circuit are disclosed and labeled as already referred to in connection with previous figures.

Before tracing through the complete sequence of mechanical and electrical operations of the packaging machine, a few comments follow with respect to some of the elements thus far described. The cylinders STC and TSC are in pairs the same as the cylinders K&GBC illustrated in Figure 1 but it is sufficient for the purpose of this application that only one of each cylinder STC and TSC be described. Likewise, the left tuckers T and the right tuckers T are in pairs as obviously required for both ends of the package.

The switch Sw-17 is a manual switch turned off while the machine is in automatic operation. It is turned to the "on" position whenever there is a stoppage during production or at the end of a production run in order to keep the glue in the gluepot 32 for the glue belt GB in usable condition.

The switch Sw-18 is turned to the "off" position while checking certain operations of the packaging machine. It is then turned to the "on" or automatic position whenever the machine is in operation (while automatically wrapping a package).

Tracing through the complete sequence of mechanical and electrical operations of the packaging machine, after manually closing the switches Sw-13, Sw-14, Sw-15, Sw-16 and Sw-18 as in Figures 21 and 22, which respectively energize the wrapper feed motor FWM, the end glue motors EGM, the top seal heater TSH and the end seal heaters ESH, and conditions the circuit at switch Sw-18 for automatic operation of the machine, the machine operates in a sequence involving the following eleven steps, steps (1) to (11) involving the closure or opening of the switches Sw-I to Sw-II respectively.

(1) The article A is loaded into the machine by placing it on the loading plate 26 and pushing it toward the stop plate 27 which closes switch Sw-I. The closure of this switch energizes the solenoid coils 3-F and 2-F sending the seal table ST up to loading level (level with loading plate 26). The circuit can be traced from L2ª through the solenoid coils 3-F and 2-F (wire c) to the line LI, and adjacent the line LI following 3-F and 2-F the resulting operation is indicated "ST up" and "ST down (exh.) (from top of ST)." Thus the present list of mechanical and electrical operations may be used in conjunction with Figures 3, 21 and 22 to quickly trace out any circuit and the resulting operations are indicated in a comparatively simple manner.

(2) Upward travel of the seal table ST opens Sw-9 and Sw-10 at the beginning of the stroke and closes Sw-2 at the top of the stroke. Closure of Sw-2 energizes the solenoid coil 5-F sending the feed ram FR forward and the knife and glue belt K&GB down. The lowering of the knife cuts the wrapper W and the lowering of the glue belt applies a strip of glue across the wrapper.

(3) Forward travel of the feed ram FR closes the switch Sw-3 at the end of the stroke, thereby energizing the relay coil R1-T and solenoid coils 6-F, 5-R and 8-R.

Energization of relay coil R1-T—
  Opens the contacts R1-1A, R1-2A, R1-3A and R1-4A:
    R1-1A de-energizes solenoid coil 3-F.
    R1-2A de-energizes solenoid coil 5-F.
    R1-3A de-energizes relay coil R1-T.
    R1-4A de-energizes solenoid coil 2-F.
  Closes contacts R1-1B, R1-2B, R1-3B and R1-4B:
    R1-1B energizes solenoid coil 3-R exhausting the air from bottom of seal table cylinder STC now in the up position.
    R1-2B results in nothing happening because switch Sw-9 is open.
    R1-3B closes line L1 to relay coil R1-C.
    R1-4B results in nothing happening until switch Sw-9 closes to establish a circuit through Sw-18 and Sw-10 to solenoid coil 2-F.
6-F sends top ram TR down.
5-R sends feed ram FR rearward and sends knife and glue belt K&GB up.
8-R sends discharge ram DR rearward and closes end seal ES (by sending the piston in ESC forward).

(4) Top ram TR travels down engaging the article A on the seal table and driving it and the wrapper W as well as the seal table ST down to wrapping position shown in Figure 11. Down travel of top ram TR closes switch Sw-4A and opens switch Sw-4B. Sw-4A energizes relay coils R2-T, R3-T and solenoid coil 6-R which latter sends the top ram TR up. As TR travels up it opens Sw-4B and closes Sw-4A for the next operating cycle.

Energization of relay coil R2-T—
  Open contacts R2-1A, R2-2A and R2-3A:
    R2-1A results in no operation because this line is already open at Sw-6.
    R2-2A de-energizes side fold solenoid SFS.
    R2-3A de-energizes relay coil R2-T.
  Closes contacts R2-1B, R2-2B, R2-3B and R2-4B:
    R2-1B are not effective until Sw-6 closes.
    R2-2B energizes timer solenoid TS$^a$ which promptly closes switch Sw-20 to de-energize the wrapper feed solenoid WFS so that the roller 30 drops down against the wrapper W and engages it with the feed roller 31 which causes feeding of the wrapper.
    R2-3B closes line L1 to relay coil R3-T.
    R2-4B are not effective until Sw-6 closes.
Energization of relay coil R3-T—
  Opens contacts R3-2A and R3-3A:
    R3-2A momentarily energizes the solenoid coils 4-R, 3-R and 1-R, but since they have already been energized, this has no effect on the respective valves V4, V3 and V1.
    R3-3A de-energizes relay coil R3-T.
  Closes contacts R3-1B, R3-2B and R3-3B:
    R3-1B energizes glue belt motor GBM.
    R3-2B energizes solenoid coil 4-F sending #1 seal plate SP1 forward and opening switch Sw-7 because of the branch line 39 sending air also to the nozzle 41 to issue as an air beam 40, and energizes the flipper solenoid FS to raise the flipper 47 to the horizontal position for supporting the feeding wrapper.
    R3-3B closes line L1 to relay coil R3-C.

(5) Forward travel of the #1 seal plate SP1 closes switch Sw-5 at the end of the stroke, energizing solenoid coil 1-F, sending #2 seal plate SP2 forward.

(6) Forward travel of the #2 seal plate SP2 closes switch Sw-6 which re-energizes the solenoid coil 3-F, for sending the seal table ST up and causing a package pressing operation as in Figure 13 just prior to the #2 seal plate finishing its stroke, and energizes the solenoid coil 7-F for sending both tuckers T forward and the top seal TS down, all three of the cylinders TC, TC and TSC being connected to the same valve V7.

(7) About this time the advance edge of the next wrapper cuts the air beam 40 of the air beam switch ABS, thereby permitting the switch Sw-1 to close and energize the relay coil R2-C.

Energization of relay coil R2-C—
  Opens contacts R2-1B, R2-2B, R2-3B and R2-4B:
    R2-1B de-energizes solenoid coil 7-F.
    R2-2B de-energizes time solenoid TS for quickly closing the switch Sw-20 and this switch in turn energizes the wrapper feed solenoid WFS to promptly cause the wrapper W to stop feeding.
    R2-3B de-energizes relay coil R2-C.
    R2-4B de-energizes solenoid coil 3-F.
  Closes contacts R2-1A, R2-2A and R2-3A:
    R2-1A energizes solenoid coil 7-R sending tuckers T back and top seal TS up.
    R2-2A energizes side fold solenoid SFS to release the pressure of side fold plate 53 on the partially wrapped package.
    R2-3A closes line L1 to relay coil R2-T.

(8) The left-hand tucker T in returning closes switch Sw-8 at the end of its stroke for energizing solenoid coil 2-R and relay coil R3-C.

Energization of relay coil R3-C—
  Opens contacts R3-1B, R3-2B and R3-3B:
    R3-1B de-energizes glue belt motor GBM.
    R3-2B de-energizes solenoid coil 4-F and flipper solenoid FS.
    R3-3B de-energizes relay coil R3-C.
  Closes contacts R3-2A and R3-3A:
    R3-2A energizes solenoid coils 1-R, 4-R and 3-R sending #1 seal plate SP1 back, closing branch air lines 39 and 84 to the air beam switch ABS (which closes switch Sw-7) and the knife blow pipe KBP sending #2 seal plate back and exhausting the air from the lower end of the seal table cylinder STC.
    R3-3A closes line L1 to relay coil R3-T.

Energization of solenoid coil 2-R sends the seal table ST down to the discharge level shown in Figure 3.

(9) Seal table ST traveling down closes Sw–9 at the lower end of its travel for energizing the solenoid coil 2-F which exhausts the air from the upper end of the seal table cylinder STC.

(10) The seal table ST in the down position closes switch Sw–9 energizing solenoid coil 8-F for sending the discharge ram DR forward and for opening the end seal ES by driving the piston of ESC rearward.

(11) As the package P travels along the discharge plate 80, past the flap folder blades 81, the glue applying rollers 82 of the end glue motors EGM and the flap folder blades 83, these elements being in pairs so as to fold both ends of the wrapper about the article, the wrapping of the package is completed. During the stroke of the package caused by the forward movement of the discharge ram DR, forward lower corner of the package P closes switch Sw–11 for energizing the relay coil R1–C and then the package goes on past the switch to let it reopen.

Energization of relay coil R1–C—
  Opens contacts R1–1B, R1–2B, R1–3B and R1–4B;
    R1–1B de-energizes solenoid coils 1–R, 3–R and 4–R.
    R1–2B de-energizes solenoid coil 2–F.
    R1–3B de-energizes relay coil R1–C.
    R1–4B de-energizes solenoid coil 8–F.
  Closes contacts R1–1A, R1–2A and R1–4A which prepare the machine for the next cycle of operations.

The complete cycle of operations is thus completed in the eleven steps just enumerated. If any one step fails to be completed because of jamming of the article or for any other cause, the machine will stop and the jammed package may be removed or the trouble remedied. Thereupon the reset switch Sw–19 may be manually depressed at the button 87 which will close the switches Sw–19b, Sw–19c and Sw–19d, and open the switch Sw–19a. Openeing of the switch Sw–19b de-energizes the reset relay solenoid RRS so that the reset relay contacts RR4 and RR1 are opened, and the reset relay contacts RR7, RR2, RR5, RR3 and RR6 are closed which results in the return of all the machine elements to their starting positions and ready for step (1). Our circuit arrangement is such that resetting can be accomplished at any point in the sequence.

The operation of the reset switch Sw–19 as just described will close the end seal ES whereupon subsequent closure of the manual switch Sw–12 will open the end seal if this is required to afford pressure relief on a jammed package. In case of a wrapper failure or a package jam-up, in order to clear the machine, the reset switch Sw–19 is held depressed while the package is being removed. Also any article A which is holding switch Sw–1 closed should be backed away from the switch and not fed to the machine again until the jammed package has been removed and the reset button 87 released.

Having described our control system and the operation thereof in connection with a packaging machine, it is believed obvious wherein the control system will accomplish the objects contemplated and provide for proper sequence of operation of the machine as well as permitting proper resetting of the various machine elements in case of jam-up or any other malfunctioning of the machine.

Some changes may be made in the construction and arrangement of the parts of our packaging machine control without departing from the real spirit and purpose of our invention, and it is our intention to cover by our claims any modified forms of structure or use of mechanical equivalents which may be reasonably included within their scope.

We claim as our invention:

1. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

2. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

3. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

4. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a cylinder and piston unit in addition to said fourth cylinder and piston unit, said eighth solenoid valve being connected therewith to move said last piston forwardly when said fourth piston is moved forwardly and rearwardly when said fourth piston is moved rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

5. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, a manually operable reset switch for said control circuit having normally closed contacts in circuit with said first to eleventh switches, and having normally open contacts to establish circuits for the rearward coils of said fifth and eighth solenoid valves, for the rearward coil of said sixth solenoid valve, for the close coil of said second relay and normally open contacts thereof, for the rearward coil of said seventh solenoid valve, for the rearward coils of said fourth, first and third solenoid valves, for the close coil of said third relay and normally open contacts thereof, for the rearward coil of said second solenoid valve and for the close coil of said first relay and normally open contacts thereof, whereby closure of said first switch initiates a complete cycle of operations of said cylinder and piston units, and conditions the circuit and solenoid operator arrangement for recycling.

6. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, an air beam switch having normally closed contacts constituting a seventh switch, said seventh switch being opened by an air beam fed from said fourth solenoid valve when the forward solenoid thereof is energized, means to interrupt said air beam for causing said seventh switch to close, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

7. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

8. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioninig the valve to move it rearwardly, a cylinder and piston unit in addition to said fourth cylinder and piston unit, said eighth solenoid valve being connected therewith to move said last piston forwardly when said fourth piston is moved forwardly and rearwardly when said fourth piston is moved rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

9. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a cylinder and piston unit in addition to said fourth cylinder and piston unit, said eighth solenoid valve being connected therewith to move said last piston forwardly when said fourth piston is moved forwardly and rearwardly when said fourth piston is moved rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eight solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

10. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a cylinder and piston unit in addition to said fourth cylinder and piston unit, said eighth solenoid valve being connected therewith to move said last piston forwardly when said fourth piston is moved forwardly and rearwardly when said fourth piston is moved rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

11. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a blow pipe fed with air from said fourth solenoid valve when the rearward coil thereof is energized, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

12. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a cylinder and piston unit in addition to said fourth cylinder and piston unit, said eighth solenoid valve being connected therewith to move said last piston forwardly when said fourth piston is moved forwardly and rearwardly when said fourth piston is moved rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, an air beam switch having normally closed contacts constituting a seventh switch, said seventh switch being opened by an air beam fed from said fourth solenoid valve when the forward solenoid thereof is energized, means to interrupt said air beam for causing said seventh switch to close, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, whereby closure of said first switch initiates a complete cycle of operations of said cylinder and piston units, and conditions the circuit and solenoid operator arrangement for recycling.

13. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, a manually operable reset switch for said control circuit having normally closed contacts in circuit with said first to eleventh switches, and having normally open contacts to establish circuits for the rearward coils of said fifth and eighth solenoid valves, for the rearward coil of said sixth solenoid valve, for the close coil of said second relay and normally open contacts thereof, for the rearward coil of said seventh solenoid valve, for the rearward coils of said fourth, first and third solenoid valves, for the close coil of said third relay and normally open contacts thereof, for the rearward coil of said second solenoid valve and for the close coil of said first relay and normally open contacts thereof, whereby closure of said first switch initiates a complete cycle of operations of said cylinder and piston units, and conditions the circuit and solenoid operator arrangement for recycling.

14. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a cylinder and piston unit in addition to said fourth cylinder and piston unit, said fifth solenoid valve when its forward solenoid is energized supplying fluid to move said last piston forwardly and when its rearward solenoid is energized supplying fluid to move said last piston rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, a manually operable reset switch for said control circuit having normally closed contacts in circuit with said first to eleventh switches and having normally open contacts, a reset relay having a reset solenoid, normally closed contacts to be opened and normally open contacts to be closed when said reset relay solenoid is energized, said normally open contacts of said reset switch when closed establishing a circuit through said reset relay solenoid and to the normally open contacts of said reset relay, establishing a circuit through the close coil of said second relay and normally open contacts thereof and establishing a circuit through the close coil of said first relay and normally open contacts thereof, said normally open contacts of said reset relay when closed establishing circuits for the rearward coils of said fifth and eighth solenoid valves, for the rearward coil of said sixth solenoid valve, for the close coil of said second relay and normally open contacts thereof, for the rearward coil of said seventh solenoid valve, for the rearward coils of said fourth, first and third solenoid valves, for the close coil of said third relay and normally open contacts thereof, and for the rearward coil of said second solenoid valve, whereby closure of said first switch initiates a complete cycle of operations of said cylinder and piston units, and conditions the circuit and solenoid operator arrangement for recycling.

15. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, a cylinder and piston unit in addition to said sixth cylinder and piston unit, said seventh valve being connected therewith to move said last piston forwardly when said sixth piston is moved forwardly and rearwardly when said sixth piston is moved rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of sad seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, a manually operable reset switch for said control circuit having normally closed contacts in circuit with said first to eleventh switches, and having normally open contacts to establish circuits for the rearward coils of said fifth and eighth solenoid valves, for the rearward coil of said sixth solenoid valve, for the close coil of said second relay and normally open contacts thereof, for the rearward coil of said seventh solenoid valve, for the rearward coils of said fourth, first and third solenoid valves, for the close coil of said third relay and normally open contacts thereof, for the rearward coil of said second solenoid valve and for the close coil of said first relay and normally open contacts thereof, whereby closure of said first switch initiates a complete cycle of operations of said cylinder and piston units, and conditions the circuit and solenoid operator arrangement for recycling.

16. A circuit and solenoid operator arrangement for a plurality of fluid-operated cylinder and piston units comprising a first solenoid valve having a solenoid for positioning the valve to move a first piston forwardly in its cylinder and a solenoid for positioning the valve to move it rearwardly, a second solenoid valve having a solenoid for positioning the valve to exhaust fluid from the forward end of a second cylinder and a second solenoid for positioning the valve to admit fluid thereto to move it rearwardly, a third solenoid valve having a solenoid for positioning the valve to admit fluid to the rearward end of said second cylinder to move its piston forwardly and a solenoid for positioning the valve to exhaust fluid therefrom, a fourth solenoid valve having a solenoid for positioning the valve to move a third piston forwardly in its cylinder and a solenoid for positioning the valve to move it rearwardly, a fifth solenoid valve having a solenoid for positioning the valve to move a fourth piston forwardly in its cylinder and a solenoid for positioning the valve to move it rearwardly, a sixth solenoid valve having a solenoid for positioning the valve to move a fifth piston forwardly in its cylinder and a solenoid for positioning the valve to move it rearwardly, a seventh solenoid valve having a solenoid for positioning the valve to move a sixth piston forwardly in its cylinder and a solenoid for positioning the valve to move it rearwardly, an eighth solenoid valve having a solenoid for positioning the valve to move a seventh piston forwardly in its cylinder and a solenoid for positioning the valve to move it rearwardly, a first switch adapted to be closed to initiate a cycle of operations of said circuit and solenoid operator arrangement, a second switch adapted to be closed by said second piston in its forward movement, a third switch adapted to be closed by said fourth piston in its forward position, a fourth switch having normally closed contacts for opening a first circuit and normally open contacts for closing a second circuit when the switch is operated, said fourth switch being adapted to be operated by said fifth piston in its rearward position, a fifth switch adapted to be closed by said third piston in its forward position, a sixth switch adapted to be closed by said first piston in its forward position, a seventh switch adapted to be closed when a wrapper element reaches a predetermined position, an eighth switch adapted to be closed by said sixth piston in its rearward position, ninth and tenth switches adapted to be closed by said second piston in its rearward position, an eleventh switch adapted to be closed and then reopened by said seventh piston adjacent its outer limit of movement, and a control circuit for said solenoid valves comprising three relays each having a close coil, a trip coil, normally open contacts adapted to be closed and normally closed contacts adapted to be opened by energization of said close coil, and normally closed contacts adapted to be opened and normally open contacts adapted to be closed by energization of said trip coil, said first relay having normally closed contacts in circuit with said first switch and the forward solenoid of said third solenoid valve, having normally closed contacts in circuit with said second switch and the forward solenoid of said fifth solenoid valve, having normally closed contacts in circuit with said third switch and the trip coil of said first relay, the forward coil of said sixth solenoid valve, the rearward coil of said fifth solenoid valve and the rearward coil of said eighth solenoid valve being also in circuit with said third switch, the rearward coil of said sixth solenoid valve being in circuit with the normally closed contacts of said fourth switch, the forward coil of said fourth solenoid valve being in circuit with the normally open contacts of said fourth switch and normally open contacts of said third relay, the forward coil of said first solenoid valve being in circuit with said fifth switch and normally open contacts of said second relay, the forward coil of said seventh solenoid valve being in circuit with said sixth switch and normally open contacts of said second relay, the rearward coil of said seventh solenoid valve being in circuit with said sixth switch and normally closed contacts of said second relay, the rearward coil of said fourth solenoid valve, the rearward coil of said first solenoid valve and the rearward coil of said third solenoid valve being in circuit with normally open contacts of said first relay and normally closed contacts of said third relay, the rearward coil of said second solenoid valve being in circuit with said sixth, seventh and eighth switches, the forward coil of said second solenoid valve being in circuit with said first switch and normally closed contacts of said first relay and also in circuit with said ninth switch and normally open contacts of said first relay, the forward coil of said eighth solenoid valve being in circuit with said ninth and tenth switches and with normally open contacts of said first relay, the close coil of said first relay being in circuit with said eleventh switch and normally open contacts of said first relay, the normally closed contacts of said fourth switch being in circuit with the trip coil of said second relay and normally closed contacts thereof and in circuit with the trip coil of said third relay and normally closed contacts thereof, said sixth and seventh switches being in circuit with the close coil of said second relay and normally open contacts thereof, said sixth, seventh and eighth switches being in circuit with the close coil of said third relay and normally open contacts thereof, a manually operable reset switch for said control circuit having normally closed contacts in circuit with said first to eleventh switches and having normally open contacts, a reset relay having a reset solenoid, normally closed contacts to be opened and normally open contacts to be closed when said reset relay solenoid is energized, said normally open contacts of said reset switch when closed establishing a circuit through said reset relay solenoid and to the normally open contacts of said reset relay, establishing a circuit through the close coil of said second relay and normally open contacts thereof and establishing a circuit through the close coil of said first relay and normally open contacts thereof, said normally open contacts of said reset relay when closed establishing circuits for the rearward coils of said fifth and eighth solenoid valves, for the rearward coil of said sixth solenoid valve, for the close coil of said second relay and normally open contacts thereof, for the rearward coil of said seventh solenoid valve, for the rearward coils of said fourth, first and third solenoid valves, for the close coil of said third relay and normally open contacts thereof, and for the rearward coil of said second solenoid valve, whereby closure of said first switch initiates a complete cycle of operations of said cylinder and piston units, and conditions the circuit and solenoid operator arrangement for recycling.

References Cited in the file of this patent

UNITED STATES PATENTS

| Number | Name | Date |
|---|---|---|
| 810,005 | Teeney | Jan. 16, 1906 |
| 860,176 | Wing | July 16, 1907 |
| 1,851,457 | Smith | Mar. 29, 1932 |
| 2,011,505 | Smith | Aug. 13, 1935 |
| 2,066,449 | Barrett | Jan. 5, 1937 |
| 2,146,997 | Smith | Feb. 14, 1939 |
| 2,292,487 | Stevens | Aug. 11, 1942 |